US007417757B2

(12) United States Patent
Shinohara

(10) Patent No.: US 7,417,757 B2
(45) Date of Patent: Aug. 26, 2008

(54) IMAGE FORMING APPARATUS

(75) Inventor: Tadashi Shinohara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1060 days.

(21) Appl. No.: 10/652,068

(22) Filed: Sep. 2, 2003

(65) Prior Publication Data

US 2004/0041896 A1 Mar. 4, 2004

(30) Foreign Application Priority Data

Sep. 4, 2002 (JP) ............................ 2002-259240

(51) Int. Cl.
*G06F 3/12* (2006.01)

(52) U.S. Cl. ...................... 358/1.15; 358/1.1; 382/276; 382/281; 382/312; 382/314

(58) Field of Classification Search ................ 358/1.15, 358/1.1, 3-3.25, 3.26-3.27, 3.28, 3.29; 347/116, 347/118, 232, 234; 382/162-167, 173-180, 382/181-231, 254-275, 276-311, 312-324
See application file for complete search history.

(56) References Cited

U.S. PATENT DOCUMENTS

| | | | |
|---|---|---|---|
| 5,621,221 | A | 4/1997 | Shinohara et al. |
| 5,737,665 | A | 4/1998 | Sugiyama et al. |
| 5,765,083 | A | 6/1998 | Shinohara |
| 5,875,380 | A | 2/1999 | Iwata et al. |
| 5,899,597 | A | 5/1999 | Shinohara et al. |
| 5,962,783 | A | 10/1999 | Iwata et al. |

(Continued)

FOREIGN PATENT DOCUMENTS

| | | |
|---|---|---|
| JP | 06-035287 | 2/1994 |

(Continued)

OTHER PUBLICATIONS

U.S. Appl. No. 10/041,648, filed Jan. 10, 2002, Yamanaka et al.

(Continued)

*Primary Examiner*—King Poon
*Assistant Examiner*—Iriana Cruz
(74) *Attorney, Agent, or Firm*—Oblon, Spivak, McClelland, Maier & Neustadt, P.C.

(57) ABSTRACT

An image forming apparatus, which includes a plurality of image forming portions transferring a yellow image, a magenta image, a cyan image, and a black image formed on a plurality of photoconductor drums to a sheet conveyed on a conveying belt, a marking unit forming marks on the conveying belt, a detecting unit detecting the marks with three or more sensors aligned in a direction normal to a direction in which the sheet is conveyed, a calculating unit calculating an amount of color misalignment in accordance with results detected by the detecting unit, and a correcting unit correcting the color misalignment in accordance with the calculated amount of color misalignment, wherein the calculating unit calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting unit corrects the skew difference in accordance with the calculated amount of skew difference.

12 Claims, 8 Drawing Sheets

U.S. PATENT DOCUMENTS

| | | | | |
|---|---|---|---|---|
| 5,963,240 | A | 10/1999 | Shinohara et al. | |
| 6,019,365 | A * | 2/2000 | Matsumura | 271/227 |
| 6,118,557 | A | 9/2000 | Sugiyama et al. | |
| 6,128,459 | A | 10/2000 | Iwata et al. | |
| 6,282,396 | B1 | 8/2001 | Iwata et al. | |
| 6,295,435 | B1 | 9/2001 | Shinohara et al. | |
| 6,380,960 | B1 | 4/2002 | Shinohara | |
| 6,381,435 | B2 | 4/2002 | Shinohara et al. | |
| 6,573,918 | B2 | 6/2003 | Kobayashi et al. | |
| 6,587,137 | B2 | 7/2003 | Shinohara et al. | |
| 6,912,325 | B2 * | 6/2005 | Rombola et al. | 382/289 |
| 2001/0028387 | A1 * | 10/2001 | Maeda | 347/232 |
| 2004/0041896 | A1 | 3/2004 | Shinohara | |
| 2004/0071896 | A1 | 4/2004 | Shinohara | |

FOREIGN PATENT DOCUMENTS

| | | | |
|---|---|---|---|
| JP | 08-286459 | | 11/1996 |
| JP | 10-221913 | | 8/1998 |
| JP | 11-84803 | | 3/1999 |
| JP | 11-254757 | * | 9/1999 |
| JP | 2001-309139 | * | 11/2001 |

OTHER PUBLICATIONS

U.S. Appl. No. 10/041,640, filed Jan. 10, 2002, Yamanaka et al.
U.S. Appl. No. 10/247,699, filed Sep. 20, 2002, Shinohara.
U.S. Appl. No. 10/243,933, filed Sep. 16, 2002, Shinohara.
U.S. Appl. No. 10/320,399, filed Dec. 17, 2002, Shinohara.
U.S. Appl. No. 10/373,755, filed Feb. 27, 2003, Kobayashi et al.
U.S. Appl. No. 10/652,068, filed Sep. 2, 2003, Shinohara.
U.S. Appl. No. 10/886,560, filed Jul. 9, 2004, Takahashi et al.
U.S. Appl. No. 10/893,261, filed Jul. 19, 2004, Shinohara et al.
U.S. Appl. No. 10/893,391, filed Jul. 19, 2004, Yokoyama et al.
U.S. Appl. No. 10/927,162, filed Aug. 27, 2004, Shinohara.
U.S. Appl. No. 11/565,422, filed Nov. 30, 2006, Shinohara et al.
U.S. Appl. No. 11/555,476, filed Nov. 1, 2006, Shinohara.
U.S. Appl. No. 11/557,289, filed Nov. 7, 2006, Unknown.
U.S. Appl. No. 11/496,510, filed Aug. 1, 2006, Shinohara.
U.S. Appl. No. 11/340,645, filed Jan. 27, 2006, Shinohara.

* cited by examiner

IMAGE FORMING APPARATUS

BACKGROUND OF THE INVENTION

1. Field of the Invention

The present invention generally relates to an image forming apparatus, such as a color copier, or a color printer, using plural photoconductor drums to form color images with four colors including cyan, magenta, yellow, and black.

2. Description of the Related Art

Conventionally, many image forming apparatuses employ a multiple drum system for forming color images. In forming color images with the multiple drum system, first, images of different color are formed on respective drums corresponding to each of the colors, and then, images for each color are separately transferred in an overlapped manner onto a transfer sheet placed on a transfer belt.

An image forming apparatus using the multiple drum system has a benefit of forming images at high speed. The image forming apparatus, however, has difficulty in controlling color misalignment. Sources causing the color misalignment are, for example, skew difference, registration difference in a sub-scanning direction, magnification error in a main scanning direction, and registration difference in a main scanning direction. Such color misalignment is a cause for lowering the quality of output images.

Japanese Laid-Open Publication No. 11-84803 discloses an art for controlling the color misalignment created upon forming color images. This art is able to control color misalignment caused by registration difference with regard to a scanning line curve of a line pattern.

More particularly, with this art, each line pattern image including the scanning line curve, which is formed on each photoconductor and then transferred to a transfer medium, can be detected by disposing three or more detection points situated in a main scanning direction. Accordingly, a value for correcting registration difference in the main scanning direction is calculated in accordance with the detected line pattern image.

Meanwhile, using the appropriate detected data for calculating the amount for correcting the color misalignment sources is essential for sufficiently correcting the color misalignment. That is, in correction of the color misalignment, it is important to determine which of the detected data (detected by plural detection sensors) should be employed for the correction. If the detected data is not used appropriately, the correction of the color misalignment will be insufficient.

SUMMARY OF THE INVENTION

It is a general object of the present invention to provide an image forming apparatus that substantially obviates one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by an image forming apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an image forming apparatus, which includes: a plurality of image forming portions transferring a yellow image, a magenta image, a cyan image, and a black image formed on a plurality of photoconductor drums to a sheet conveyed on a conveying belt; a marking unit forming marks on the conveying belt; a detecting unit detecting the marks with three or more sensors aligned in a direction normal to a direction in which the sheet is conveyed; a calculating unit calculating an amount of color misalignment in accordance with results detected by the detecting unit; and a correcting unit correcting the color misalignment in accordance with the calculated amount of color misalignment, wherein the calculating unit calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting unit corrects the skew difference in accordance with the calculated amount of skew difference.

Furthermore, the present invention provides an image forming apparatus, which includes: a plurality of image forming portions transferring a yellow image, a magenta image, a cyan image, and a black image formed on a plurality of photoconductor drums to a sheet conveyed on a conveying belt; a marking unit forming marks on the conveying belt; a detecting unit detecting the marks with three or more sensors aligned in a direction normal to a direction in which the sheet is conveyed; a calculating unit calculating an amount of color misalignment in accordance with results detected by the detecting unit; and a correcting unit correcting the color misalignment in accordance with the calculated amount of color misalignment, wherein the calculating unit calculates an amount of magnification error in a main scanning direction in accordance with results detected by two sensors among the three or more sensors, wherein one sensor of the two sensors is disposed on one end of the three or more sensors and the other sensor of the two sensors is disposed on the other end of the three or more sensors, wherein the correcting unit corrects the magnification error in the main scanning direction in accordance with the calculated amount of magnification error in the main scanning direction.

Furthermore, the present invention provides an image forming apparatus, which includes: a plurality of image forming portions transferring a yellow image, a magenta image, a cyan image, and a black image formed on a plurality of photoconductor drums to a sheet conveyed on a conveying belt; a marking unit forming marks on the conveying belt; a detecting unit detecting the marks with three or more sensors aligned in a direction normal to a direction in which the sheet is conveyed; a calculating unit calculating an amount of color misalignment in accordance with results detected by the detecting unit; and a correcting unit correcting the color misalignment in accordance with the calculated amount of color misalignment, wherein the calculating unit calculates an amount of registration difference in a sub-scanning direction in accordance with results detected by the three or more sensors, wherein the correcting unit corrects the registration difference in the sub-scanning direction in accordance with the calculated amount of registration difference in the sub-scanning direction.

In the image forming apparatus of the present invention, the calculating unit may calculate by satisfying an equation of:

$$\text{the amount of registration difference in the sub-scanning direction} = -\{(A+B)/2\},$$

wherein A=a maximum value of the registration difference in the sub-scanning direction among the results detected by the three or more sensors, wherein B=a minimum value of the registration difference in the sub-scanning direction among the results detected by the three or more sensors.

Furthermore, the present invention provides an image forming apparatus, which includes: a plurality of image forming portions transferring a yellow image, a magenta image, a cyan image, and a black image formed on a plurality of photoconductor drums to a sheet conveyed on a conveying belt; a marking unit forming marks on the conveying belt; a detecting unit detecting the marks with three or more sensors aligned in a direction normal to a direction in which the sheet is conveyed; a calculating unit calculating an amount of color misalignment in accordance with results detected by the detecting unit; and a correcting unit correcting the color misalignment in accordance with the calculated amount of color misalignment, wherein the calculating unit calculates an amount of registration difference in a main scanning direction in accordance with results detected by the three or more sensors, wherein the correcting unit corrects the registration difference in the main scanning direction in accordance with the calculated amount of registration difference in the main scanning direction.

In the image forming apparatus of the present invention, the calculating unit may calculate by satisfying an equation of:

$$\text{the amount of registration difference in the main scanning direction} = -\{(C+D)/2\},$$

wherein C=a maximum value of the registration difference in the main scanning direction among the results detected by the three or more sensors, wherein B=a minimum value of the registration difference in the main scanning direction among the results detected by the three or more sensors.

Furthermore, the present invention provides an image forming apparatus, which includes: a plurality of image forming means for transferring a yellow image, a magenta image, a cyan image, and a black image formed on a plurality of photoconductor drums to a sheet conveyed on a conveying belt; a marking means for forming marks on the conveying belt; a detecting means for detecting the marks with three or more sensors aligned in a direction normal to a direction in which the sheet is conveyed; a calculating means for calculating an amount of color misalignment in accordance with results detected by the detecting means; and a correcting means for correcting the color misalignment in accordance with the calculated amount of color misalignment, wherein the calculating means calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting means corrects the skew difference in accordance with the calculated amount of skew difference.

Furthermore, the present invention provides an image forming apparatus, which includes: a plurality of image forming means for transferring a yellow image, a magenta image, a cyan image, and a black image formed on a plurality of photoconductor drums to a sheet conveyed on a conveying belt; a marking means for forming marks on the conveying belt; a detecting means for detecting the marks with three or more sensors aligned in a direction normal to a direction in which the sheet is conveyed; a calculating means for calculating an amount of color misalignment in accordance with results detected by the detecting means; and a correcting means for correcting the color misalignment in accordance with the calculated amount of color misalignment, wherein the calculating means calculates an amount of magnification error in a main scanning direction in accordance with results detected by two sensors among the three or more sensors, wherein one sensor of the two sensors is disposed on one end of the three or more sensors and the other sensor of the two sensors is disposed on the other end of the three or more sensors, wherein the correcting means corrects the magnification error in the main scanning direction in accordance with the calculated amount of magnification error in the main scanning direction.

Furthermore, the present invention provides an image forming apparatus, which includes: a plurality of image forming means for transferring a yellow image, a magenta image, a cyan image, and a black image formed on a plurality of photoconductor drums to a sheet conveyed on a conveying belt; a marking means for forming marks on the conveying belt; a detecting means for detecting the marks with three or more sensors aligned in a direction normal to a direction in which the sheet is conveyed; a calculating means for calculating an amount of color misalignment in accordance with results detected by the detecting means.; and a correcting means for correcting the color misalignment in accordance with the calculated amount of color misalignment, wherein the calculating means calculates an amount of registration difference in a sub-scanning direction in accordance with results detected by the three or more sensors, wherein the correcting means corrects the registration difference in the sub-scanning direction in accordance with the calculated amount of registration difference in the sub-scanning direction.

In the image forming apparatus of the present invention, the calculating means may calculate by satisfying an equation of:

$$\text{the amount of registration difference in the sub-scanning direction} = -\{(A+B)/2\},$$

wherein A=a maximum value of the registration difference in the sub-scanning direction among the results detected by the three or more sensors, wherein B=a minimum value of the registration difference in the sub-scanning direction among the results detected by the three or more sensors.

Furthermore, the present invention provides an image forming apparatus, which includes: a plurality of image forming means for transferring a yellow image, a magenta image, a cyan image, and a black image formed on a plurality of photoconductor drums to a sheet conveyed on a conveying belt; a marking means for forming marks on the conveying belt; a detecting means for detecting the marks with three or more sensors aligned in a direction normal to a direction in which the sheet is conveyed; a calculating means for calculating an amount of color misalignment in accordance with results detected by the detecting means; and a correcting means for correcting the color misalignment in accordance with the calculated amount of color misalignment, wherein the calculating unit calculates an amount of registration difference in a main scanning direction in accordance with results detected by the three or more sensors, wherein the correcting unit corrects the registration difference in the main scanning direction in accordance with the calculated amount of registration difference in the main scanning direction.

In the image forming apparatus of the present invention, the calculating means calculates by satisfying an equation of:

$$\text{the amount of registration difference in the main scanning direction} = -\{(C+D)/2\},$$

wherein C=a maximum value of the registration difference in the main scanning direction among the results detected by the three or more sensors, wherein B=a minimum value of the registration difference in the main scanning direction among the results detected by the three or more sensors.

Furthermore, the present invention provides another image forming apparatus, which includes: a plurality of image forming portions transferring a yellow image, a magenta image, a cyan image, and a black image formed on a plurality of photoconductor drums to an intermediary transfer belt; a marking unit forming marks on the intermediary transfer belt; a transfer portion transferring the yellow image, the magenta image, the cyan image, and the black image on the intermediary transfer belt to a sheet conveyed on the transfer portion; a detecting unit detecting the marks with three or more sensors aligned in a direction normal to a rotating direction of the intermediary transfer belt; a calculating unit calculating an amount of color misalignment in accordance with results detected by the detecting unit; and a correcting unit correcting the color misalignment in accordance with the calculated amount of color misalignment, wherein the calculating unit calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting unit corrects the skew difference in accordance with the calculated amount of skew difference.

Furthermore, the present invention provides another image forming apparatus, which includes: a plurality of image forming portions transferring a yellow image, a magenta image, a cyan image, and a black image formed on a plurality of photoconductor drums to an intermediary transfer belt; a marking unit forming marks on the intermediary transfer belt; a transfer portion transferring the yellow image, the magenta image, the cyan image, and the black image on the intermediary transfer belt to a sheet conveyed on the transfer portion; a detecting unit detecting the marks with three or more sensors aligned in a direction normal to a rotating direction of the intermediary transfer belt; a calculating unit calculating an amount of color misalignment in accordance with results detected by the detecting unit; and a correcting unit correcting the color misalignment in accordance with the calculated amount of color misalignment, wherein the calculating unit calculates an amount of magnification error in a main scanning direction in accordance with results detected by two sensors among the three or more sensors, wherein one sensor of the two sensors is disposed on one end of the three or more sensors and the other sensor of the two sensors is disposed on the other end of the three or more sensors, wherein the correcting unit corrects the magnification error in the main scanning direction in accordance with the calculated amount of magnification error in the main scanning direction.

Furthermore, the present invention provides another image forming apparatus, which includes: a plurality of image forming portions transferring a yellow image, a magenta image, a cyan image, and a black image formed on a plurality of photoconductor drums to an intermediary transfer belt; a marking unit forming marks on the intermediary transfer belt; a transfer portion transferring the yellow image, the magenta image, the cyan image, and the black image on the intermediary transfer belt to a sheet conveyed on the transfer portion; a detecting unit detecting the marks with three or more sensors aligned in a direction normal to a rotating direction of the intermediary transfer belt; a calculating unit calculating an amount of color misalignment in accordance with results detected by the detecting unit; and a correcting unit correcting the color misalignment in accordance with the calculated amount of color misalignment, wherein the calculating unit calculates an amount of registration difference in a sub-scanning direction in accordance with results detected by the three or more sensors, wherein the correcting unit corrects the registration difference in the sub-scanning direction in accordance with the calculated amount of registration difference in the sub-scanning direction.

In the other image forming apparatus of the present invention, the calculating unit may calculate by satisfying an equation of:

$$\text{the amount of registration difference in the sub-scanning direction} = -\{(A+B)/2\},$$

wherein A=a maximum value of the registration difference in the sub-scanning direction among the results detected by the three or more sensors, wherein B=a minimum value of the registration difference in the sub-scanning direction among the results detected by the three or more sensors.

Furthermore, the present invention provides another image forming apparatus, which includes: a plurality of image forming portions transferring a yellow image, a magenta image, a cyan image, and a black image formed on a plurality of photoconductor drums to an intermediary transfer belt; a marking unit forming marks on the intermediary transfer belt; a transfer portion transferring the yellow image, the magenta image, the cyan image, and the black image on the intermediary transfer belt to a sheet conveyed on the transfer portion; a detecting unit detecting the marks with three or more sensors aligned in a direction normal to a rotating direction of the intermediary transfer belt; a calculating unit calculating an amount of color misalignment in accordance with results detected by the detecting unit; and a correcting unit correcting the color misalignment in accordance with the calculated amount of color misalignment, wherein the calculating unit calculates an amount of registration difference in a main scanning direction in accordance with results detected by the three or more sensors, wherein the correcting unit corrects the registration difference in the main scanning direction in accordance with the calculated amount of registration difference in the main scanning direction.

In the other image forming apparatus of the present invention, the calculating unit may calculate by satisfying an equation of:

$$\text{the amount of registration difference in the main scanning direction} = -\{(C+D)/2\},$$

wherein C=a maximum value of the registration difference in the main scanning direction among the results detected by the three or more sensors, wherein B=a minimum value of the registration difference in the main scanning direction among the results detected by the three or more sensors.

Furthermore, the present invention provides another image forming apparatus, which includes: a plurality of image forming means for transferring a yellow image, a magenta image, a cyan image, and a black image formed on a plurality of photoconductor drums to an intermediary transfer belt; a marking means for forming marks on the intermediary transfer belt; a transfer means for transferring the yellow image, the magenta image, the cyan image, and the black image on the intermediary transfer belt to a sheet conveyed on the transfer means; a detecting means for detecting the marks with three or more sensors aligned in a direction normal to a rotating direction of the intermediary transfer belt; a calculating means for calculating an amount of color misalignment in accordance with results detected by the detecting means; and a correcting means for correcting the color misalignment in accordance with the calculated amount of color misalignment, wherein the calculating means calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting means corrects the skew difference in accordance with the calculated amount of skew difference.

Furthermore, the present invention provides another image forming apparatus, which includes: a plurality of image forming means for transferring a yellow image, a magenta image, a cyan image, and a black image formed on a plurality of photoconductor drums to an intermediary transfer belt; a marking means for forming marks on the intermediary transfer belt; a transfer means for transferring the yellow image, the magenta image, the cyan image, and the black image on the intermediary transfer belt to a sheet conveyed on the transfer means; a detecting means for detecting the marks with three or more sensors aligned in a direction normal to a rotating direction of the intermediary transfer belt; a calculating means for calculating an amount of color misalignment in accordance with results detected by the detecting means; and a correcting means for correcting the color misalignment in accordance with the calculated amount of color misalignment, wherein the calculating means calculates an amount of magnification error in a main scanning direction in accordance with results detected by two sensors among the three or more sensors, wherein one sensor of the two sensors is disposed on one end of the three or more sensors and the other sensor of the two sensors is disposed on the other end of the three or more sensors, wherein the correcting means corrects the magnification error in the main scanning direction in accordance with the calculated amount of magnification error in the main scanning direction.

Furthermore, the present invention provides another image forming apparatus, which includes: a plurality of image forming means for transferring a yellow image, a magenta image, a cyan image, and a black image formed on a plurality of photoconductor drums to an intermediary transfer belt; a marking means for forming marks on the intermediary transfer belt; a transfer means for transferring the yellow image, the magenta image, the cyan image, and the black image on the intermediary transfer belt to a sheet conveyed on the transfer means; a detecting means for detecting the marks with three or more sensors aligned in a direction normal to a rotating direction of the intermediary transfer belt; a calculating means for calculating an amount of color misalignment in accordance with results detected by the detecting means; and a correcting means for correcting the color misalignment in accordance with the calculated amount of color misalignment, wherein the calculating means calculates an amount of registration difference in a sub-scanning direction in accordance with results detected by the three or more sensors, wherein the correcting means corrects the registration difference in the sub-scanning direction in accordance with the calculated amount of registration difference in the sub-scanning direction.

In the other image forming apparatus of the present invention, the calculating means may calculate by satisfying an equation of:

$$\text{the amount of registration difference in the sub-scanning direction} = -\{(A+B)/2\},$$

wherein A=a maximum value of the registration difference in the sub-scanning direction among the results detected by the three or more sensors, wherein B=a minimum value of the registration difference in the sub-scanning direction among the results detected by the three or more sensors.

Furthermore, the present invention provides another image forming apparatus, which includes: a plurality of image forming means for transferring a yellow image, a magenta image, a cyan image, and a black image formed on a plurality of photoconductor drums to an intermediary transfer belt; a marking means for forming marks on the intermediary transfer belt; a transfer means for transferring the yellow image, the magenta image, the cyan image, and the black image on the intermediary transfer belt to a sheet conveyed on the transfer means; a detecting means for detecting the marks with three or more sensors aligned in a direction normal to a rotating direction of the intermediary transfer belt; a calculating means for calculating an amount of color misalignment in accordance with results detected by the detecting means; and a correcting means for correcting the color misalignment in accordance with the calculated amount of color misalignment, wherein the calculating unit calculates an amount of registration difference in a main scanning direction in accordance with results detected by the three or more sensors, wherein the correcting unit corrects the registration difference in the main scanning direction in accordance with the calculated amount of registration difference in the main scanning direction.

In the other image forming apparatus of the present invention, the calculating means may calculate by satisfying an equation of:

$$\text{the amount of registration difference in the main scanning direction} = -\{(C+D)/2\},$$

wherein C=a maximum value of the registration difference in the main scanning direction among the results detected by the three or more sensors, wherein B=a minimum value of the registration difference in the main scanning direction among the results detected by the three or more sensors.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to FIGS. 1 through 10.

Figure 1:
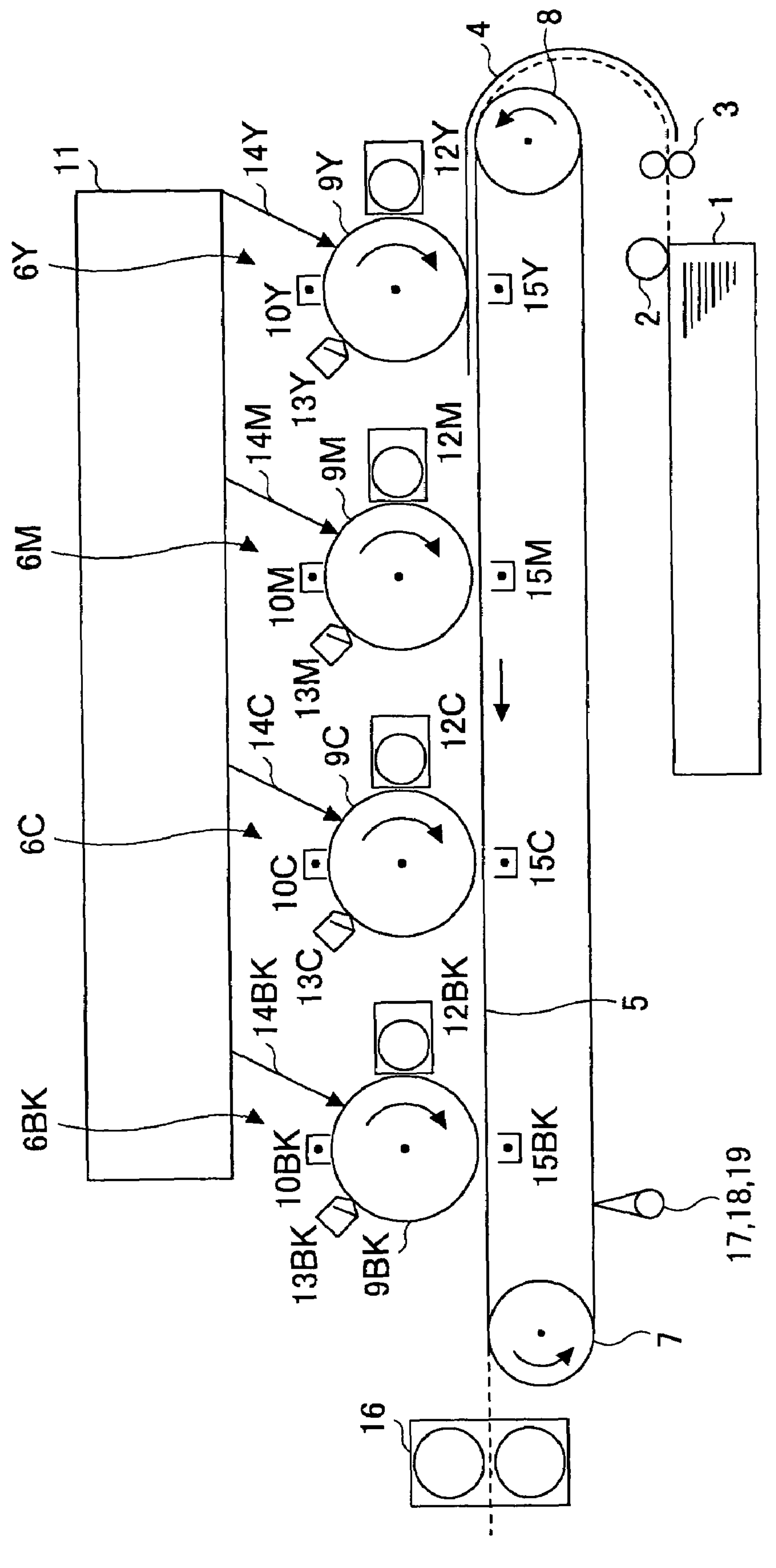
FIG. 1 is a schematic diagram showing an image forming apparatus according to an embodiment of the present invention.

FIG. 1 is a schematic view showing an image forming apparatus according a first embodiment of the present invention. With reference to FIG. 1, this embodiment shows a tandem type color image forming apparatus having plural image forming portions arranged along a conveying belt 5.

Each image forming portion includes a photoconductor, a latent image forming unit for forming a latent image for each color on the surface of the photoconductor, and a visualization unit for visualizing the latent image. By transferring the images on the surface of the photoconductors to a transfer sheet conveyed by the conveying belt 5, a color image can be obtained.

More particularly, the color image forming apparatus shown in FIG. 1 includes the conveying belt 5 for conveying a transfer sheet 4, a driving roller 7, a driven roller 8, a sheet-feeding tray 1, an exposure unit 11, a fixing unit 16, and the plural image forming portions (a yellow image forming portion 6Y, a magenta image forming portion 6M, a cyan image forming portion 6C, and a black image forming portion 6BK).

The yellow image forming portion 6Y serves as an image forming portion for forming yellow color (Y) images. The yellow image forming portion 6Y includes a photoconductor drum 9Y, a charging unit 10Y disposed at the periphery of the photoconductor drum 9Y, a developing unit 12Y, a photoconductor cleaner (not shown), an erasing unit 13Y, and a transferring unit 15Y.

Likewise, the magenta image forming portion 6M serves as an image forming portion for forming magenta color (M) images. The magenta image forming portion 6M includes a photoconductor drum 9M, a charging unit 10M disposed at the periphery of the photoconductor drum 9M, a developing unit 12M, a photoconductor cleaner (not shown), an erasing unit 13M, and a transferring unit 15M.

Furthermore, the cyan image forming portion 6C serves as an image forming portion for forming cyan color (C) images. The cyan image forming portion 6C includes a photoconductor drum 9C, a charging unit 10C disposed at the periphery of the photoconductor drum 9C, a developing unit 12C, a photoconductor cleaner (not shown), an erasing unit 13C, and a transferring unit 15C.

Furthermore, the black image forming portion 6BK serves as an image forming portion for forming black color (BK) images. The black image forming portion 6BK includes a photoconductor drum 9BK, a charging unit 10BK disposed at the periphery of the photoconductor drum 9BK, a developing unit 12BK, a photoconductor cleaner (not shown), an erasing unit 13BK, and a transferring unit 15BK.

With reference to FIG. 1, a description on how color images are formed by the color forming portions of the color image forming apparatus is given below.

The yellow color image forming portion 6Y, the magenta color image forming portion 6M, the cyan color image forming portion 6C, and the black color image forming portion 6BK are aligned in a single row along the conveyor belt 5 serving to convey the transfer sheet 4.

The conveying belt 5 is stretched between the driving roller 7.and the driven roller 8 subordinate to the driving roller 7, and is rotatively driven in the arrow direction by the rotation of the driving roller 7 and the driven roller 8. The conveying belt is formed as an endless belt wound around the driving roller 7 and the driven roller 8.

The sheet feeding tray 1 having a stack of transfer sheets contained therein is disposed below the conveying belt 5. In performing an image forming process, a transfer sheet placed on the uppermost portion of the stack is fed and is absorbed on the conveying belt 5 by electrostatic absorption. The transfer sheet 4 absorbed on the conveying belt 5 is conveyed to the yellow image forming portion 6Y at which a yellow image forming procedure is performed.

After the surface of the photoconductor drum 9Y of the yellow image forming portion 6Y is uniformly charged by the charging unit 10Y, the exposing unit 11 exposes a laser light 14Y, which corresponds to yellow images, to the surface of the photoconductor drum 9Y, to thereby form an electrostatic latent image. The developing unit 12Y develops the electrostatic latent image to thereby form a toner image on the surface of the photoconductor drum 9Y. The transferring unit 15Y transfers the toner image to the transfer sheet at a contacting area (transfer area) at which the photoconductor drum 9Y and the transfer sheet 4 on the conveying belt 5 make contact. After the toner image is transferred, the photoconductor cleaner removes residual toner remaining on the surface of the photoconductor drum 9Y, to thereby prepare for a next image forming operation. Then, the transfer sheet 4 having a yellow image formed thereon is conveyed to the magenta image forming portion 6M by the conveying belt 5.

In the same manner as the yellow image forming procedure, after the surface of the photoconductor drum 9M of the magenta image forming portion 6M is uniformly charged by the charging unit 10M, the exposing unit 11 exposes a laser light 14M, which corresponds to magenta images, to the surface of the photoconductor drum 9M, to thereby form an electrostatic latent image. The developing unit 12M develops the electrostatic latent image to thereby form a toner image on the surface of the photoconductor drum 9M. The transferring unit 15M transfers the toner image to the transfer sheet 4 in a manner where the toner image overlaps the yellow image formed by the yellow image forming portion 6Y. After the toner image is transferred, the photoconductor cleaner removes residual toner remaining on the surface of the photoconductor drum 9M, to thereby prepare for a next image forming operation. Then, the transfer sheet 4 is conveyed to the cyan image forming portion 6C by the conveying belt 5.

Likewise, after the surface of the photoconductor drum 9C of the cyan image forming portion 6C is uniformly charged by the charging unit 10C, the exposing unit 11 exposes a laser light 14C, which corresponds to cyan images, to the surface of the photoconductor drum 9C, to thereby form an electrostatic latent image. The developing unit 12C develops the electrostatic latent image to thereby form a toner image on the surface of the photoconductor drum 9C. The transferring unit 15C transfers the toner image to the transfer sheet 4 in a manner where the toner image overlaps the images formed by the yellow image forming portion 6Y and the magenta image forming portion 6M. After the toner image is transferred, the photoconductor cleaner removes residual toner remaining on the surface of the photoconductor drum 9C, to thereby prepare for a next image forming operation. Then, the transfer sheet 4 is conveyed to the black image forming portion 6BK by the conveying belt 5.

Likewise, after the surface of the photoconductor drum 9BK of the black image forming portion 6BK is uniformly charged by the charging unit 10BK, the exposing unit 11 exposes a laser light 14BK, which corresponds to black images, to the surface of the photoconductor drum 9BK, to thereby form an electrostatic latent image. The developing unit 12BK develops the electrostatic latent image to thereby form a toner image on the surface of the photoconductor drum 9BK. The transferring unit 15BK transfers the toner image to the transfer sheet 4 in a manner where the toner image overlaps the images formed by the yellow image forming portion 6Y, the magenta image forming portion 6M, and the cyan image forming portion 6C. After the toner image is transferred, the photoconductor cleaner removes residual toner remaining on the surface of the photoconductor drum 9BK, to thereby prepare for a next image forming operation. The procedure for forming yellow, magenta, cyan, and black images is completed when the toner image formed by the black image forming portion 6BK is transferred to the transfer sheet 4. As a result, a color image is formed on the transfer sheet 4. After passing the black image forming portion 6BK, the transfer sheet 4 having the color image formed thereto is separated from the conveying belt 5. Then, after the fixing unit 16 fixes the toner image onto the transfer sheet 4, the transfer sheet 4 is discharged from the color image forming apparatus.

Next, a description on color misalignment caused during the foregoing color image forming procedure is given below.

The color misalignment refers to a case where one toner image of one color overlaps with another toner image(s) of another color(s) at a position deviating from a position at which the toner image was supposed to overlap with the other toner image(s). The color misalignment is caused by, for example, error inherent in the spaces between photoconductor drums 9Y, 9M, 9C, and 9BK, error inherent in the parallel arrangement of the photoconductor drums 9Y, 9M, 9C, and 9BK, error inherent in the placement of deflection mirrors (not shown) for deflecting the laser light of the exposing unit 11, or error inherent in the timing for writing the electrostatic images to the photoconductor drums 9Y, 9M, 9C, and 9BK.

As for source mainly causing the color misalignment, there are, for example, skew difference, registration difference in a sub-scanning direction, magnification error in a main scanning direction, and registration difference in the main scanning direction.

In order to correct the color misalignment, a front sensor 17, a center sensor 18, and a rear sensor 19 are disposed downstream of the black image forming portion 6BK and thus at a position facing the conveying belt 5. The front sensor 17, the center sensor 18, and the rear sensor 19 are supported on a same substrate along the main scanning direction which is normal to a direction of the arrow illustrated at a center portion of the conveying belt 5.

Next, a description of a signal processing portion 21 processing signals detected from the front sensor 17, the center sensor 18, and the rear sensor 19 is given below.

Figure 2:
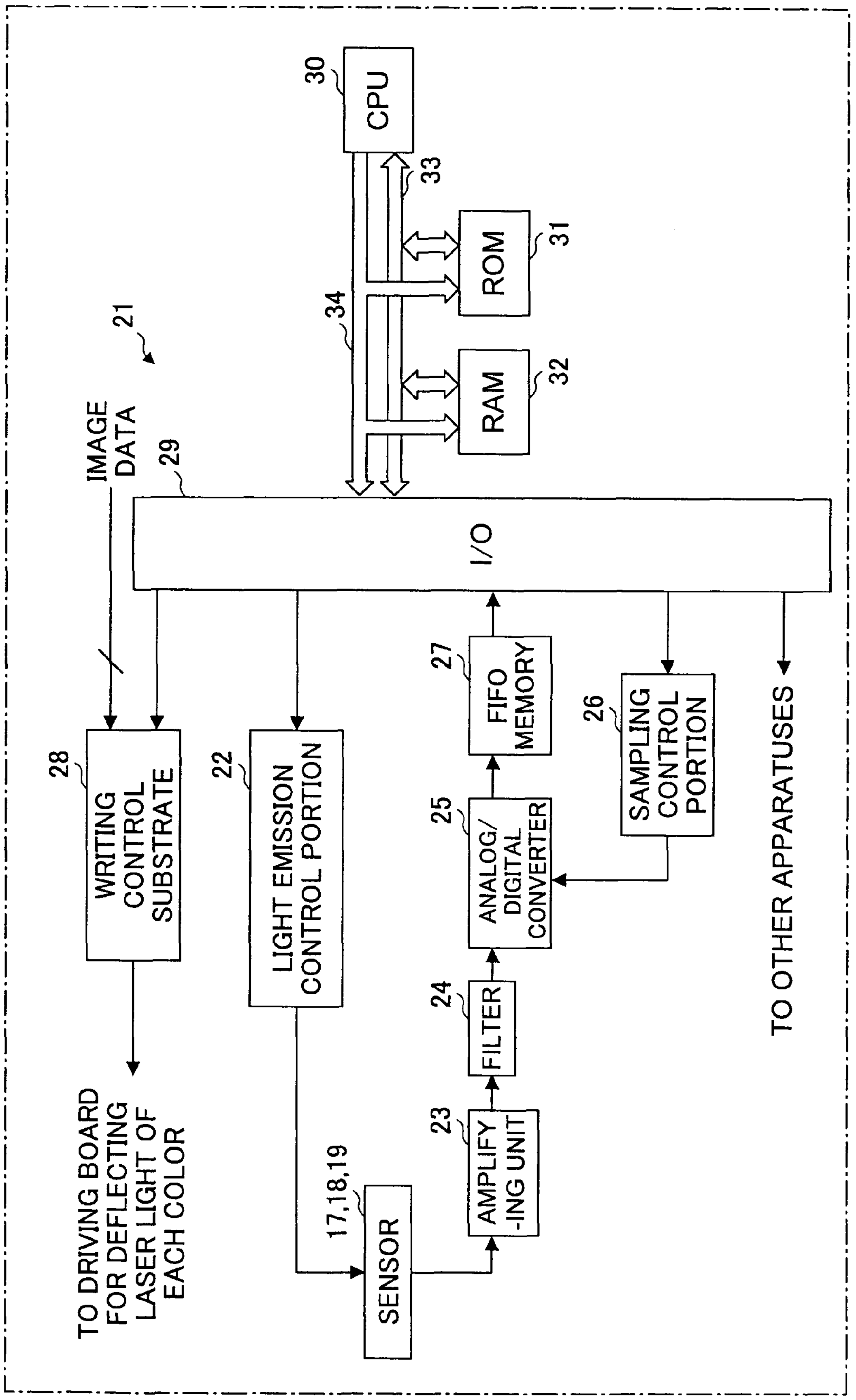
FIG. 2 is a schematic diagram showing a signal processing portion according to an embodiment of the present invention.

FIG. 2 is a schematic view showing the signal processing portion 21 of this embodiment. The front sensor 17, the center sensor 18, and the rear sensor 19 respectively have a light receiving element (not shown) and a light emitting element (not shown) controlled by a light emission control portion 22 and are connected to an input/output (I/O) port 29 at an output side thereof via an amplifying unit (AMP) 23, a filter 24, an analog/digital converter 25, and a first-in-first-out (FIFO) memory 27.

The detected signals obtained from the front sensor 17, the center sensor 18, and the rear sensor 19 are amplified by AMP 23, filtered through the filter 24, and converted from analog data to digital data by the A/D converter 25. The sampling of the data is controlled by a sampling control portion 26 and the sampled data is stored in the FIFO memory 27.

The input/output (I/O) port 29 is connected with the sampling control portion 26, the FIFO memory 27, and a writing control substrate 28. A data bus 33 and a address bus 34 serve to connect the I/O port 29, a CPU (Central Processing Unit) 30, a ROM (Read Only Memory) 31, and a RAM (Random Access Memory) 32.

The ROM 31 stores various programs including a program for calculating various amounts regarding color misalignment of toner images. It is to be noted that the address bus 34 serves to designate a ROM address, a RAM address, and various input/output apparatuses.

The CPU 40 monitors the detection signals from the front sensor 17, the center sensor 18, and the rear sensor 19 with a prescribed timing, and uses the light emission control portion 22 to control the light emission amount of the light emitting elements of the front sensor 17, the center sensor 18, and the rear sensor 19 so that toner images can be detected consistently even in a case where, for example, the performance of the light emitting elements of the front sensor 17, the center sensor 18, and the rear sensor 19 has deteriorated. Thereby, the CPU 40 enables the light reception signals from the light receiving elements to be constantly output at a steady level.

The CPU 30 performs various configurations to the writing control substrate 28 in order to change image frequency in accordance with the correction amount derived from a result from position detection toner marks formed for position detection, registration changes in the main/sub scanning direction, and magnification error in the main/sub scanning direction. In correspondence to each color, the writing control substrate 28 has a device (e.g. a clock generator using a VCO (Voltage Control Oscillator Circuit)) which is able to minutely configure an output image frequency. Thereby, the output serves as an image writing clock for writing electrostatic images to the photoconductor drums 9Y, 9M, 9C, and 9BK.

Furthermore, the CPU 30 controls a skew adjustment stepping motor (not shown) inside the exposing unit 11 in accordance with the correction amount derived from a result from the position detection toner marks.

Figure 3:
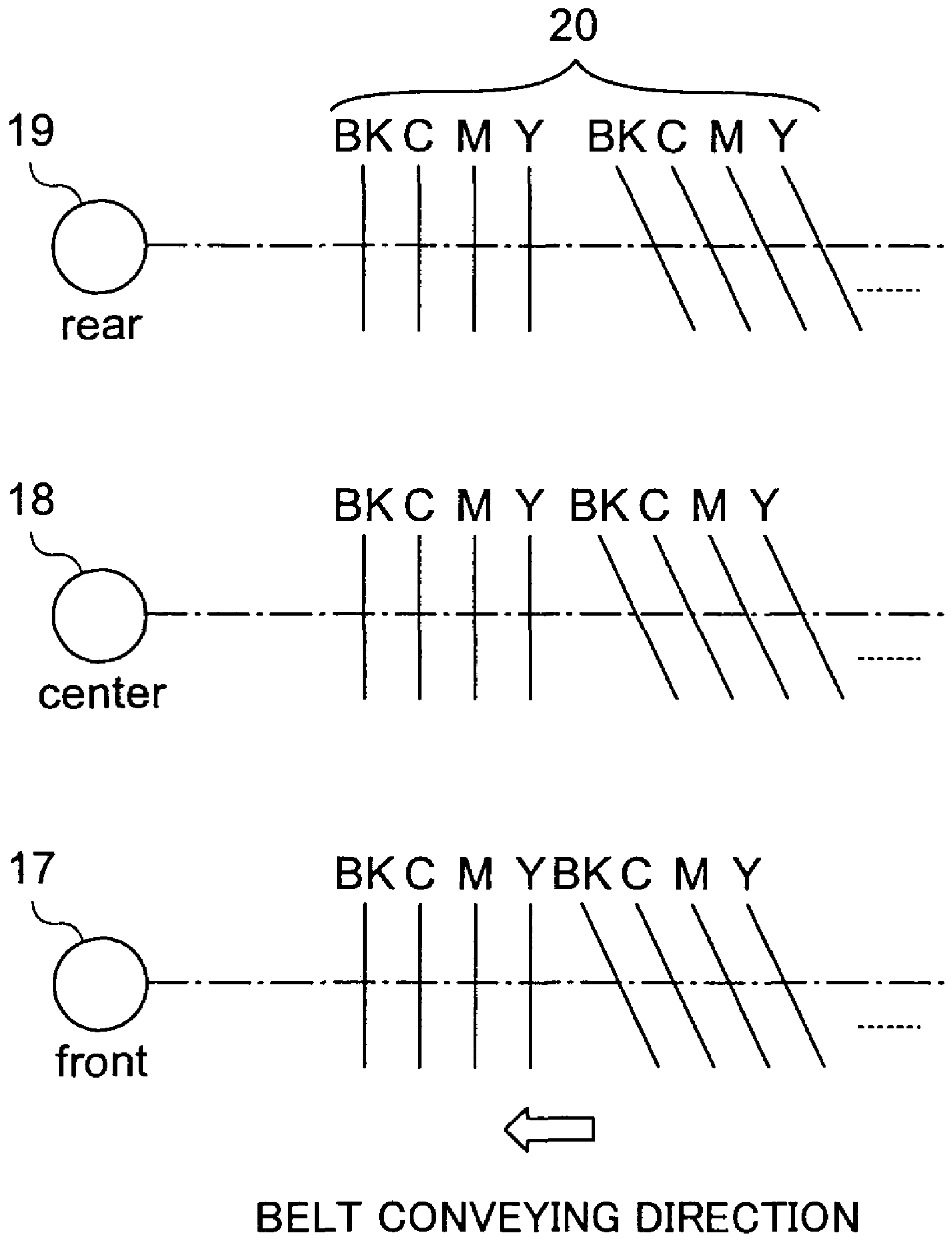
FIG. 3 is a diagram showing an example of an arrangement of position detection toner marks formed on a conveying belt.

FIG. 3 shows an example of a row of position detection toner marks 20 formed on the conveying belt 5 for position detection (position adjustment). The color image forming apparatus forms the row of position detection toner marks 20 comprising horizontal lines and diagonal lines of BK, C, M, and Y on the conveying belt 5, thereby allowing the front sensor 17, the center sensor 18, and the rear sensor 19 aligned in the main scanning direction to the detect the row of position detection toner marks 20. Then, skew difference, registration difference in a sub-scanning direction, registration difference in a main scanning direction, magnification error in a main scanning direction with respect to a criterial color (in this embodiment, the criterial color is Black (BK)) can be measured in accordance with the results detected by the front sensor 17, the center sensor 18, and the rear sensor 19. Furthermore, amounts regarding various differences and amounts required for correction can be calculated in accordance with the detected results. The CPU 40 corrects each of the color misalignment sources in the following manner.

Skew difference is corrected by changing the tilt of mirrors disposed inside the exposing unit 11 (not shown) for deflecting laser light corresponding to each color. The skew adjustment stepping motor (not shown) is used as a driving source for biasing the tilt of the mirrors.

Figure 4:
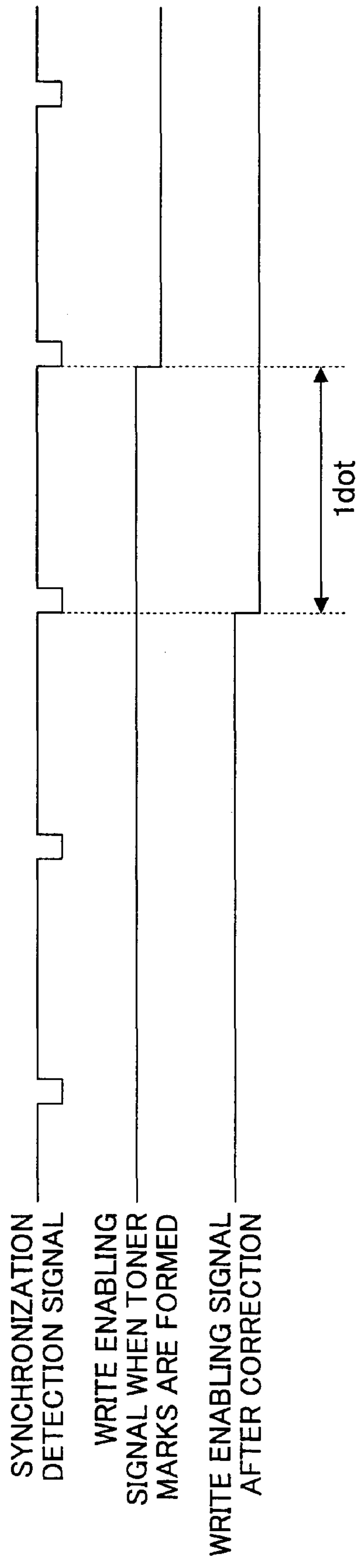
FIG. 4 is a diagram showing a timing chart used in correcting the timing for writing in a sub-scanning direction.

FIG. 4 is a timing chart used in correcting the timing for writing in the sub-scanning direction. It is to be noted that the resolution for correction in this embodiment is 1 dot.

Write enabling signals, which are image area signals for the sub-scanning direction, serve to adjust the timing for writing in association with synchronization detection signals. For example, in a case where a writing timing is required to be earlier for a length of 1 dot according to the detected marks and the results of the calculations, the write enabling signal is activated 1 dot length earlier (see FIG. 4).

Figure 5:
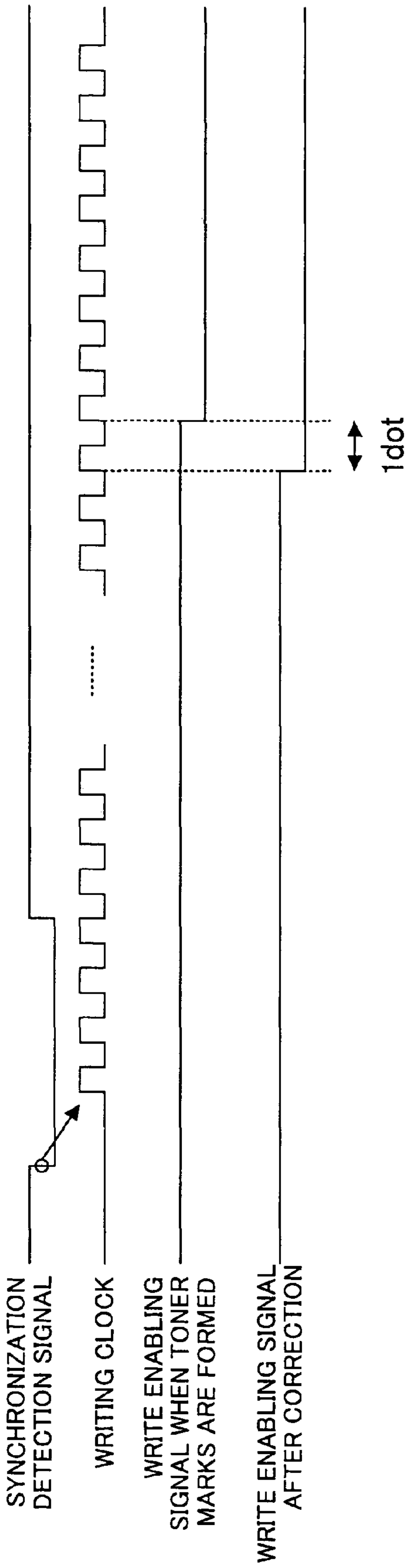
FIG. 5 is a diagram showing a timing chart used in correcting the timing for writing in a main scanning direction.

Furthermore, FIG. 5 is a timing chart used in correcting the timing for writing in the main scanning direction. It is to be noted that the resolution for correction in this embodiment is 1 dot.

The image writing clock serves as a clock signal precisely in phase with each line in accordance with a falling edge of the synchronization detection signals. Other than the writing of images performed in synchronicity with the clock signals, image write enabling signals in the main scanning direction are also created in synchronicity with the clock signal. For example, in a case where a writing timing is required to be earlier for a length of 1 dot according to the detected marks and the results of the calculations, the write enabling signal is activated 1 clock length earlier (see FIG. 5).

According to detected marks and the results of the calculations, in a case where magnification in the main scanning direction is deviated from the criterial color, the magnification can be changed by using a device (e.g. a clock generator) capable of minutely changing the steps of the output frequency.

The foregoing correcting procedure can be executed, for example, in the below given situations.

1. In a situation of initializing the image forming apparatus immediately after electric power is switched on.
2. In a situation where a temperature of a prescribed portion inside the image forming apparatus (e.g. a portion in the exposing unit) has surpassed a prescribed temperature.
3. In a situation immediately after the amount of printed sheets has exceeded a prescribed amount.
4. In a situation where a user has input a prescribed command from an operation panel or from a printer driver.

Next, a detailed description regarding a method of calculating the amount of correcting color misalignment is given below.

With reference to FIG. 3, eight patterns comprising horizontal and diagonal lines are formed on the conveying belt 5 in correspondence to each of the sensors 17, 18, and 19.

An example of the calculation method and numerals thereof are hereinafter described for BK (Black) and C (Cyan). Meanwhile, since the calculation method for M (Magenta) and Y (Yellow) can be executed in the same manner as that of BK (Black) and C (Cyan), a description thereof is omitted. It is to be noted that n=1, 2, 3 . . . 8.

In this embodiment: the space between BK horizontal line and C horizontal line which corresponds to the front sensor 17 is referred to as "ΔDCK_f_n"; the space between BK horizontal line and C horizontal line which corresponds to the center sensor 18 is referred to as "ΔDCK_c_n"; the space between BK horizontal line and C horizontal line which correspond to the rear sensor 19 is referred to as "ΔDCK_r_n"; the space between BK horizontal line and BK diagonal line which corresponds to the front sensor 17 is referred to as "ΔDK_f_n"; the space between C horizontal line and C diagonal line which corresponds to the front sensor 17 is referred to as "ΔDC_f_n"; the space between BK horizontal line and BK diagonal line which corresponds to the center sensor 18 is referred to as "ΔDK_c_n"; the space between C horizontal line and C diagonal line which corresponds to the center sensor 18 is referred to as "ΔDC_c_n"; the space between BK horizontal line and BK diagonal line which corresponds to the rear sensor 19 is referred to as "ΔDK_r_n"; and the space between C horizontal line and C diagonal line which corresponds to the rear sensor 19 is referred to as "ΔDC_r_n".

It is to be noted that, in this embodiment, the front sensor 17 and the rear sensor 18 are mounted having a space of L mm therebetween. In addition, the actual length of the image area is 297 mm.

In pattern n, the amount of skew for C in the entire image area with respect to BK (indicated as "ΔSCn") is obtained as below.

$$\Delta SCn=(\Delta DCK\_r\_n-\Delta DCK\_f\_n)\times 297/L$$

wherein, n=1, 2, 3, . . . 8.

Then, the final amount of skew for C with respect to BK (indicated as "ΔSC") is derived as given below, that is, an average of the above obtained amounts of skew is derived.

$$\Delta SC=\sum_{n=1}^{8}\Delta SCn/8$$

In consequence, the skew is corrected without referring to a value detected by the center sensor 18, but by referring to the values detected by the front sensor 17 and the rear sensor 19, to thereby allow the skew of the entire image area to be corrected precisely.

Accordingly, by correcting registration difference in the sub-scanning direction (described below) after the skew of the entire image area has been corrected, color misalignment can be corrected more precisely.

Next, in pattern n, magnification error in the main scanning direction for C in the entire image area with respect to BK (indicated as "ΔZCn") is obtained as given below.

$$\Delta ZCn=\{(\Delta DC\_r\_n-\Delta DK\_r\_n)-(\Delta DC\_f\_n-\Delta DK\_f\_n)\}\times 297/L$$

wherein, n=1, 2, 3, . . . 8.

Then, the final amount of magnification error in the main scanning direction for C with respect to BK (indicated as "ΔZC") is derived below, that is, an average for the above obtained amounts of magnification error is derived.

$$\Delta ZC=\sum_{n=1}^{8}\Delta ZCn/8$$

A relation between a frequency in a case where position detection marks has been formed (indicated as "f0C" [MHz]) and a frequency in a case where magnification error has been corrected (indicated as "f'C" [MHz]) can be expressed as follows:

$$f'C=(1+\Delta ZC/297)\times f0C$$

In consequence, magnification error in the main scanning direction is corrected without referring to a value detected by the center sensor 18, but by referring to the values detected by the front sensor 17 and the rear sensor 19, to thereby allow magnification error in the main scanning direction of the entire image area to be corrected precisely.

Accordingly, by correcting registration difference in the main scanning direction (described below) after the magnification error of the entire image area has been corrected, color misalignment can be corrected more precisely.

Figure 6:
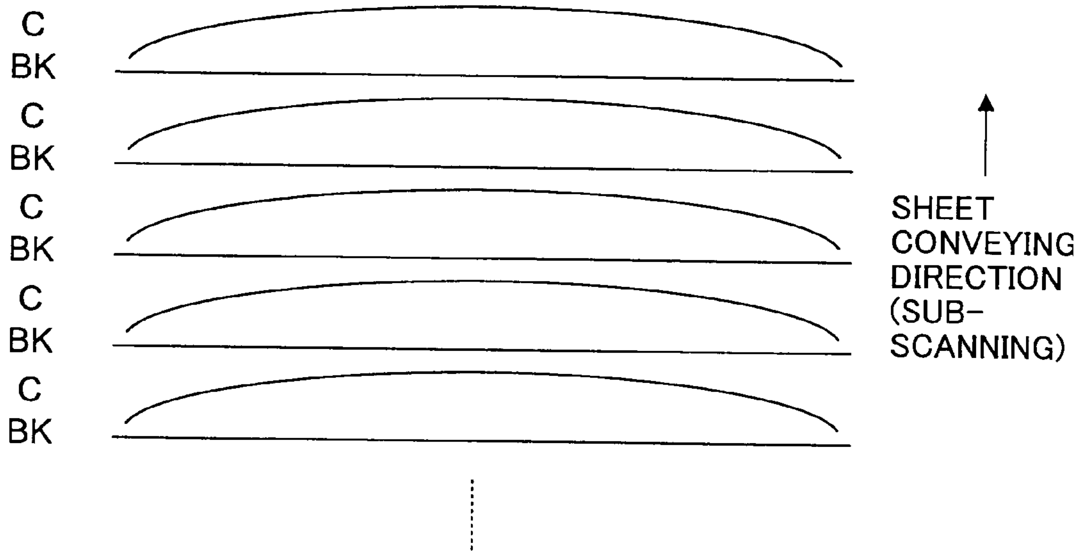
FIG. 6 is a diagram showing a registration difference in a sub-scanning direction after skew has been corrected.

FIG. 6 is a diagram showing registration difference in the sub-scanning direction after skew has been corrected. FIG. 6 shows C formed as a curved scanning line (bend) with respect to BK. Therefore, in correcting the registration difference in the sub-scanning direction, it is necessary to take the bend into consideration.

Therefore, in order to correct registration difference in the sub-scanning direction, the correction is required to be executed in accordance with the detected results of the three sensors 17, 18, and 19.

In this embodiment, an average of the registration differences in the sub-scanning direction for the eight patterns corresponding to the front sensor 17 is referred to as "ΔFC_f", an average of registration differences in the sub-scanning direction for the eight patterns corresponding to the center sensor 18 is referred to as "ΔFC_c", and an average of registration differences in the sub-scanning direction for the eight patterns corresponding to the rear sensor 19 is referred to as "ΔFC_r", wherein "FC" is the optimum position for registration in the sub-scanning direction with regard to C. Accordingly, the respective averages are obtained as given below.

$$\Delta FC\_f = \sum_{n=1}^{8} (\Delta DCK\_f\_n - FC)/8$$

$$\Delta FC\_c = \sum_{n=1}^{8} (\Delta DCK\_c\_n - FC)/8$$

$$\Delta FC\_r = \sum_{n=1}^{8} (\Delta DCK\_r\_n - FC)/8$$

In this embodiment, a function for obtaining the maximum value among ΔFC_f, ΔFC_c, and ΔFC_r is referred to as "max(ΔFC_f, ΔFC_c, ΔFC_r)", and a function for obtaining the minimum value among ΔFC_f, ΔFC_c, and ΔFC_r is referred to as "min(ΔFC_f, ΔFC_c, ΔFC_r)". Accordingly, the final registration difference in the sub-scanning direction "ΔFC" is obtained as given below.

$$\Delta FC=\{\max(\Delta FC\_f, \Delta FC\_c, \Delta FC\_r)+\min(\Delta FC\_f, \Delta FC\_c, \Delta FC\_r)\}/2$$

Figure 7:
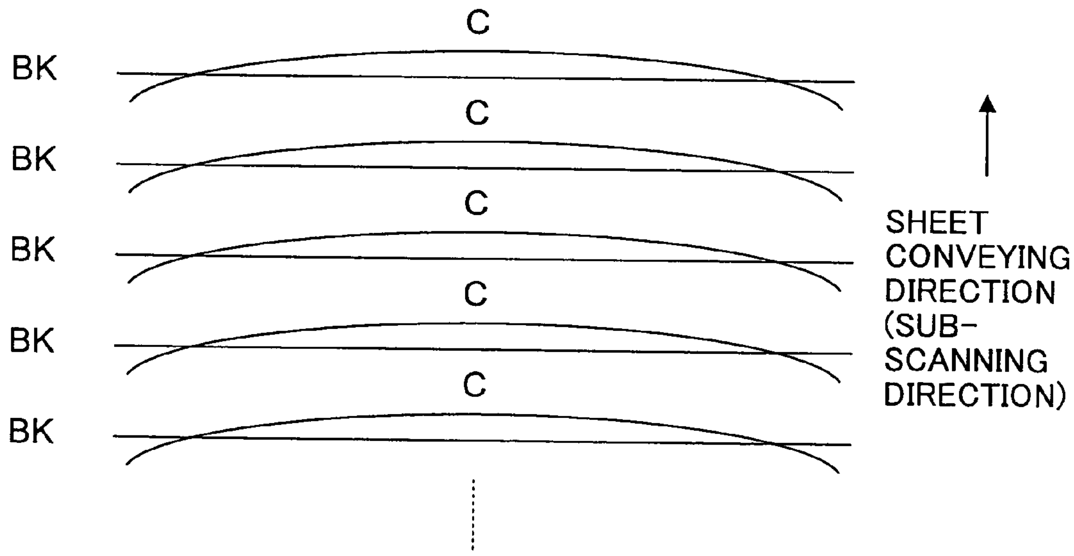
FIG. 7 is a diagram showing an example where registration difference in a sub-scanning direction is corrected with respect to write timing.

Accordingly, the amount of registration difference in the sub-scanning direction can be satisfactorily corrected while taking the bend into consideration by correcting the writing timing in accordance with the obtained registration difference in the sub-scanning direction. FIG. 7 shows the manner in which the registration difference in the sub-scanning direction is corrected.

Figure 8:
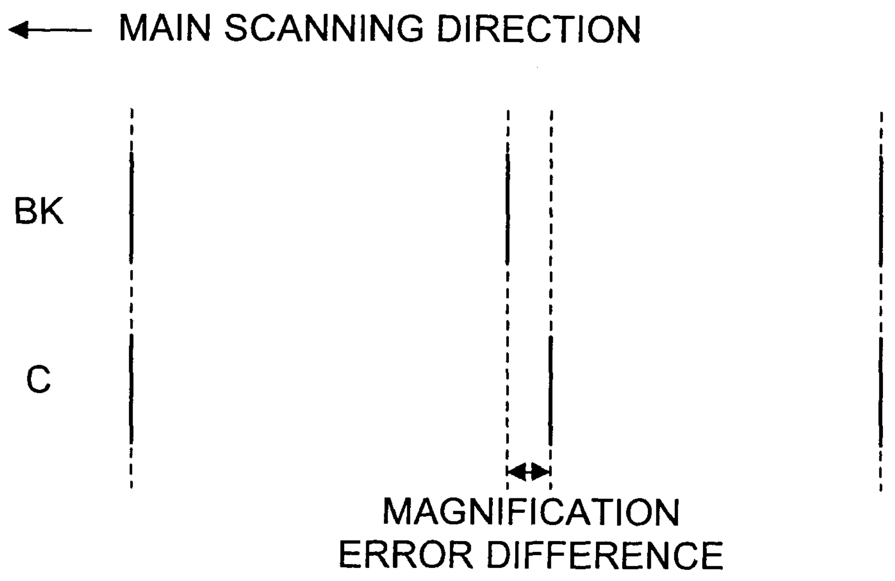
FIG. 8 is a diagram showing a registration difference in a main-scanning direction after entire magnification has been corrected.

Next, FIG. 8 is a diagram showing registration difference in the main scanning direction after magnification of the entire image area has been corrected. FIG. 8 shows C with a magnification error difference with respect to BK, wherein the center portion of C is in a deviated state while magnification error for the front and rear side of C is in a matched state. Therefore, in correcting the registration difference in the main scanning direction, it is necessary to take the magnification error difference into consideration.

Accordingly, the correction of the registration difference in the main scanning direction is executed in accordance with the detected results of the three sensors 17, 18, and 19.

In this embodiment, an average of the registration differences in the main scanning direction for the eight patterns corresponding to the front sensor 17 is referred to as "ΔSRC_f", an average of registration differences in the main scanning direction for the eight patterns corresponding to the center sensor 18 is referred to as "ΔSRC_c", and an average of registration differences in the main scanning direction for the eight patterns corresponding to the rear sensor 19 is referred to as "ΔSRC_r", wherein "SRC" is an optimum position for registration in the main scanning direction with regard to C. Accordingly, the respective averages are obtained as given below.

$$\Delta SRC\_f = \sum_{n=1}^{8} (\Delta DC\_f\_n - \Delta DK\_f\_n)/8$$

$$\Delta SRC\_c = \sum_{n=1}^{8} (\Delta DC\_c\_n - \Delta DK\_c\_n)/8$$

$$\Delta SRC\_r = \sum_{n=1}^{8} (\Delta DC\_r\_n - \Delta DK\_r\_n)/8$$

In this embodiment, a function for obtaining the maximum value among ΔSRC_f, ΔSRC_c, and ΔSRC_r is referred to as "max(ΔSRC_f, ΔSRC_c ΔSRC_r)", and a function for obtaining the minimum value among ΔSRC_f, ΔSRC_c, and ΔSRC_r is referred to as "min(ΔSRC_f, ΔSRC_c, ΔSRC_r)". Accordingly, the final amount of registration difference in the main scanning direction "ΔSRC" is obtained as given below.

$$\Delta SRC=\{\max(\Delta SRC\_f, \Delta SRC\_c, \Delta SRC\_r)+\min(\Delta SRC\_f, \Delta SRC\_c, \Delta SRC\_r)\}/2$$

Figure 9:
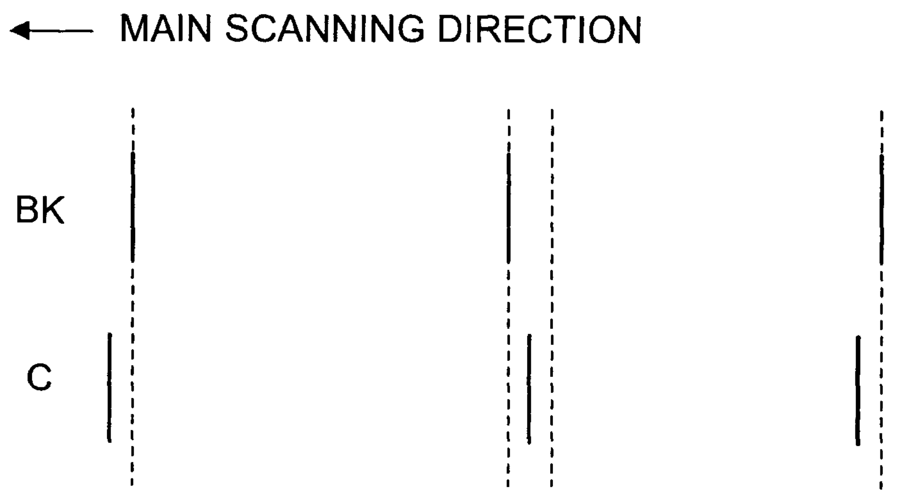
FIG. 9 is a diagram showing an example where registration difference in a main-scanning direction is corrected with respect to write timing.

Accordingly, the amount of registration difference in the main scanning direction can be satisfactorily corrected while taking the magnification error difference into consideration by correcting the writing timing in accordance with the obtained registration difference in the main scanning direction. FIG. 9 shows the manner in which the registration difference in the main scanning direction is corrected.

Although the first embodiment is described using a tandem type color image forming apparatus, correction of color misalignment can also be performed with an image forming apparatus of a second embodiment (see FIG. 10) which uses an intermediary transfer belt 35 as an intermediary transfer unit instead using the conveying belt 5.

Figure 10:
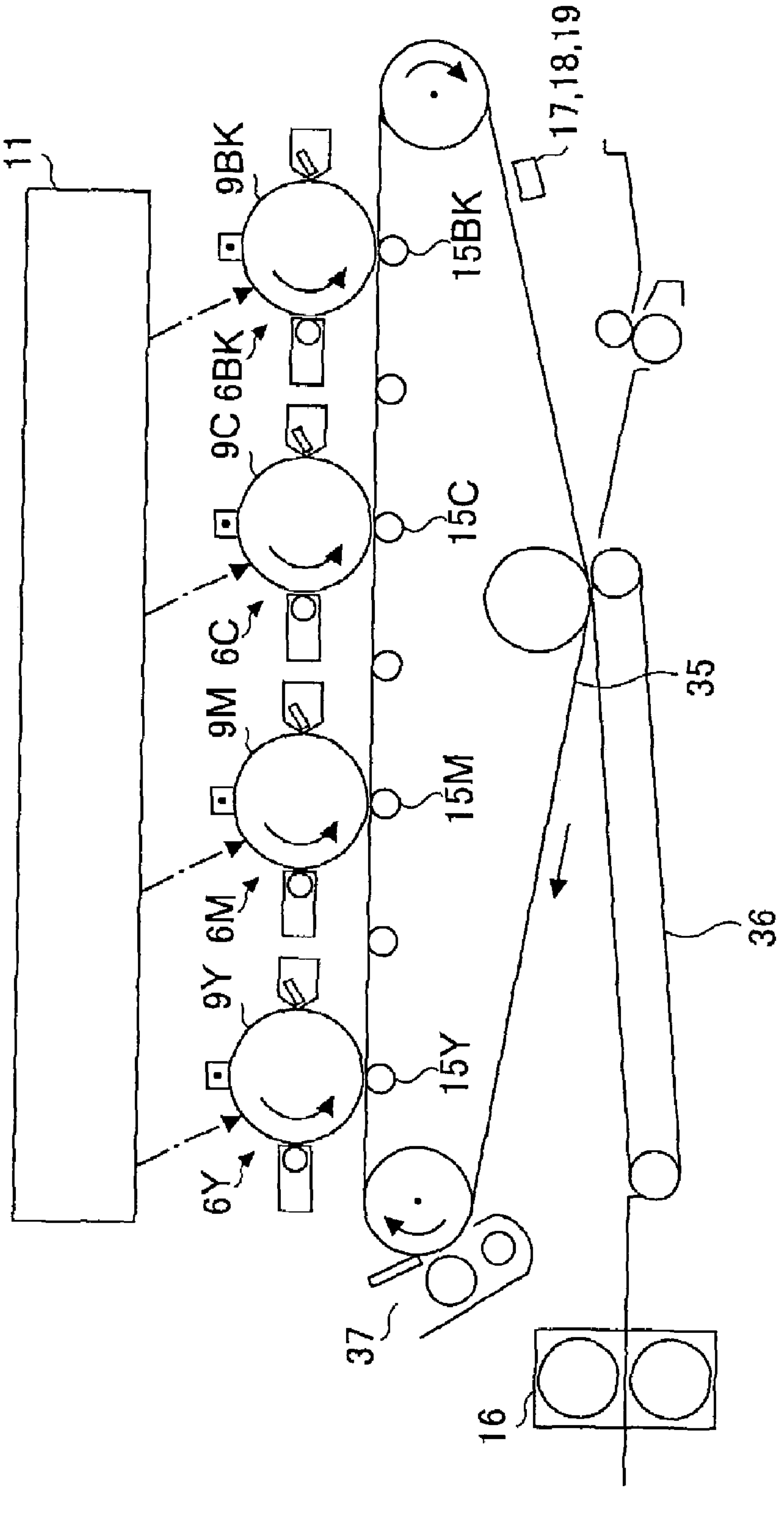
FIG. 10 is a schematic diagram showing an image forming apparatus having an intermediary transfer belt according to a second embodiment of the present invention.

In the image forming apparatus shown in FIG. 10, the images formed by the yellow image forming portion 6Y, the magenta image forming portion 6M, the cyan image forming portion 6C, and the black image forming portion 6BK are first transferred to the intermediary transfer belt 35, and then, the images are transferred to a transfer sheet with a transfer belt 36. In addition, the transfer belt 36 also serves to convey the transfer sheet to the fixing unit 16. Furthermore, the intermediary transfer belt 35 is cleaned by a cleaning unit 37.

In the second embodiment, the position detection toner marks are formed on the intermediary transfer belt 35. Accordingly, in the same manner shown in FIG. 1, the front sensor 17, the center sensor 18, and the rear sensor 19 are aligned in the main scanning direction normal to a rotating direction of the intermediary transfer belt 35. That is, the rotation direction of the intermediary transfer belt 35 corresponds to a direction illustrated with an arrow shown in FIG. 10, and the direction at which the front sensor 17, the center sensor 18, and the rear sensor 19 (main scanning direction) are aligned is a direction normal to the arrow direction. The position detection toner marks are formed on areas of the intermediary transfer belt 35 aimed to be detected by the front sensor 17, the center sensor 18, and the rear sensor 19.

Thus structured, the positions of the images to be formed on the photoconductor drums 9Y, 9M, 9C, and 9BK can be corrected according to the position detection toner marks formed on the intermediary transfer belt 35.

With the present invention, precision in correcting the skew for an entire image area can be improved by using results detected with the sensors disposed on both ends of a plurality of sensors.

With the present invention, precision in correcting the magnification in a main scanning direction can be improved by using results detected with the sensors disposed on both ends of a plurality of sensors.

With the present invention, an optimum amount for correcting registration in a sub-scanning direction for an entire image area can be determined by using the results detected with every sensor in a plurality of sensors.

With the present invention, an optimum amount for correcting registration in a main scanning direction for an entire image area can be determined by using the results detected with every sensor in a plurality of sensors.

Further, the present invention is not limited to these embodiments, but various variations and modifications may be made without departing from the scope of the present invention.

The present application is based on Japanese Priority Application No. 2002-259240 filed on Sep. 4, 2002, with the Japanese Patent Office, the entire contents of which are hereby incorporated by reference.

What is claimed is:

1. An image forming apparatus, comprising:

a plurality of image forming portions transferring a yellow image, a magenta image, a cyan image, and a black image formed on a plurality of photoconductor drums to an intermediary transfer belt;

a marking unit forming marks on the intermediary transfer belt;

a transfer portion transferring the yellow image, the magenta image, the cyan image, and the black image on the intermediary transfer belt to a sheet conveyed on the transfer portion;

a detecting unit detecting the marks with three or more sensors aligned in a direction normal to a rotating direction of the intermediary transfer belt;

a calculating unit calculating an amount of color misalignment in accordance with results detected by the detecting unit; and a correcting unit correcting the color misalignment in accordance with the calculated amount of color misalignment, wherein the calculating unit calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting unit corrects the skew difference in accordance with the calculated amount of skew difference.

2. An image forming apparatus, comprising:

a plurality of image forming portions transferring a yellow image, a magenta image, a cyan image, and a black image formed on a plurality of photoconductor drums to an intermediary transfer belt;

a marking unit forming marks on the intermediary transfer belt;

a transfer portion transferring the yellow image, the magenta image, the cyan image, and the black image on the intermediary transfer belt to a sheet conveyed on the transfer portion;

a detecting unit detecting the marks with three or more sensors aligned in a direction normal to a rotating direction of the intermediary transfer belt;

a calculating unit calculating an amount of color misalignment in accordance with results detected by the detecting unit; and a correcting unit correcting the color misalignment in accordance with the calculated amount of color misalignment, wherein the calculating unit calculates an amount of magnification error in a main scanning direction in accordance with results detected by two sensors among the three or more sensors, wherein one sensor of the two sensors is disposed on one end of the three or more sensors and the other sensor of the two sensors is disposed on the other end of the three or more sensors, wherein the correcting unit corrects the magnification error in the main scanning direction in accordance with the calculated amount of magnification error in the main scanning direction.

3. An image forming apparatus, comprising:

a plurality of image forming portions transferring a yellow image, a magenta image, a cyan image, and a black image formed on a plurality of photoconductor drums to an intermediary transfer belt;

a marking unit forming marks on the intermediary transfer belt;

a transfer portion transferring the yellow image, the magenta image, the cyan image, and the black image on the intermediary transfer belt to a sheet conveyed on the transfer portion;

a detecting unit detecting the marks with three or more sensors aligned in a direction normal to a rotating direction of the intermediary transfer belt;

a calculating unit calculating an amount of color misalignment in accordance with results detected by the detecting unit; and a correcting unit correcting the color misalignment in accordance with the calculated amount of color misalignment, wherein the calculating unit calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting unit corrects the skew difference in accordance with the calculated amount of skew difference, wherein after correcting the skew difference, the calculating unit calculates an amount of registration difference in a sub-scanning direction in accordance with results detected by the three or more sensors, wherein the correcting unit corrects the registration difference in the sub-scanning direction in accordance with the calculated amount of registration difference in the sub-scanning direction.

4. The image forming apparatus as claimed in claim 3, wherein the calculating unit calculates by satisfying an equation of:

$$\text{the amount of registration difference in the sub-scanning direction}=-\{(A+B)/2\},$$

wherein A=a maximum value of the registration difference in the sub-scanning direction among the results detected by the three or more sensors, wherein B=a minimum value of the registration difference in the sub-scanning direction among the results detected by the three or more sensors.

5. An image forming apparatus, comprising:

a plurality of image forming portions transferring a yellow image, a magenta image, a cyan image, and a black image formed on a plurality of photoconductor drums to an intermediary transfer belt;

a marking unit forming marks on the intermediary transfer belt;

a transfer portion transferring the yellow image, the magenta image, the cyan image, and the black image on the intermediary transfer belt to a sheet conveyed on the transfer portion;

a detecting unit detecting the marks with three or more sensors aligned in a direction normal to a rotating direction of the intermediary transfer belt;

a calculating unit calculating an amount of color misalignment in accordance with results detected by the detecting unit; and a correcting unit correcting the color misalignment in accordance with the calculated amount of color misalignment, wherein the calculating unit calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting unit corrects the skew difference in accordance with the calculated amount of skew difference, wherein after correcting the skew difference, the calculating unit calculates an amount of registration difference in a main scanning direction in accordance with results detected by the three or more sensors, wherein the correcting unit corrects the registration difference in the main scanning direction in accordance with the calculated amount of registration difference in the main scanning direction.

6. The image forming apparatus as claimed in claim 5, wherein the calculating unit calculates by satisfying an equation of:

$$\text{the amount of registration difference in the main scanning direction}=-\{(C+D)/2\},$$

wherein C=a maximum value of the registration difference in the main scanning direction among the results detected by the three or more sensors, wherein B=a minimum value of the registration difference in the main scanning direction among the results detected by the three or more sensors.

7. An image forming apparatus, comprising:

a plurality of image forming means for transferring a yellow image, a magenta image, a cyan image, and a black image formed on a plurality of photoconductor drums to an intermediary transfer belt;

a marking means for forming marks on the intermediary transfer belt;

a transfer means for transferring the yellow image, the magenta image, the cyan image, and the black image on the intermediary transfer belt to a sheet conveyed on the transfer means;

a detecting means for detecting the marks with three or more sensors aligned in a direction normal to a rotating direction of the intermediary transfer belt;

a calculating means for calculating an amount of color misalignment in accordance with results detected by the detecting means; and a correcting means for correcting the color misalignment in accordance with the calculated amount of color misalignment, wherein the calculating means calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting means corrects the skew difference in accordance with the calculated amount of skew difference.

8. An image forming apparatus, comprising:

a plurality of image forming means for transferring a yellow image, a magenta image, a cyan image, and a black image formed on a plurality of photoconductor drums to an intermediary transfer belt;

a marking means for forming marks on the intermediary transfer belt;

a transfer means for transferring the yellow image, the magenta image, the cyan image, and the black image on the intermediary transfer belt to a sheet conveyed on the transfer means;

a detecting means for detecting the marks with three or more sensors aligned in a direction normal to a rotating direction of the intermediary transfer belt;

a calculating means for calculating an amount of color misalignment in accordance with results detected by the detecting means; and a correcting means for correcting the color misalignment in accordance with the calculated amount of color misalignment, wherein the calculating means calculates an amount of magnification error in a main scanning direction in accordance with results detected by two sensors among the three or more sensors, wherein one sensor of the two sensors is disposed on one end of the three or more sensors and the other sensor of the two sensors is disposed on the other end of the three or more sensors, wherein the correcting means corrects the magnification error in the main scanning direction in accordance with the calculated amount of magnification error in the main scanning direction.

9. An image forming apparatus, comprising:

a plurality of image forming means for transferring a yellow image, a magenta image, a cyan image, and a black image formed on a plurality of photoconductor drums to an intermediary transfer belt;

a marking means for forming marks on the intermediary transfer belt;

a transfer means for transferring the yellow image, the magenta image, the cyan image, and the black image on the intermediary transfer belt to a sheet conveyed on the transfer means;

a detecting means for detecting the marks with three or more sensors aligned in a direction normal to a rotating direction of the intermediary transfer belt;

a calculating means for calculating an amount of color misalignment in accordance with results detected by the detecting means; and a correcting means for correcting the color misalignment in accordance with the calculated amount of color misalignment, wherein the calculating means calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting means corrects the skew difference in accordance with the calculated amount of skew difference, wherein after correcting the skew difference, the calculating means calculates an amount of registration difference in a sub-scanning direction in accordance with results detected by the three or more sensors, wherein the correcting means corrects the registration difference in the sub-scanning direction in accordance with the calculated amount of registration difference in the sub-scanning direction.

10. The image forming apparatus as claimed in claim 9, wherein the calculating means calculates by satisfying an equation of:

the amount of registration difference in the sub-scanning direction $=-\{(A+B)/2\}$, wherein A=a maximum value of the registration difference in the sub-scanning direction among the results detected by the three or more sensors, wherein B=a minimum value of the registration difference in the sub-scanning direction among the results detected by the three or more sensors.

11. An image forming apparatus, comprising:

a plurality of image forming means for transferring a yellow image, a magenta image, a cyan image, and a black image formed on a plurality of photoconductor drums to an intermediary transfer belt;

a marking means for forming marks on the intermediary transfer belt;

a transfer means for transferring the yellow image, the magenta image, the cyan image, and the black image on the intermediary transfer belt to a sheet conveyed on the transfer means;

a detecting means for detecting the marks with three or more sensors aligned in a direction normal to a rotating direction of the intermediary transfer belt;

a calculating means for calculating an amount of color misalignment in accordance with results detected by the detecting means; and a correcting means for correcting the color misalignment in accordance with the calculated amount of color misalignment, wherein the calculating means calculates an amount of skew difference in accordance with results detected by two sensors among the three or more sensors, wherein one sensor of the two sensors is disposed on one end of the three or more sensors and the other sensor of the two sensors is disposed on the other end of the three or more sensors, wherein the correcting means corrects the skew difference in accordance with the calculated amount of skew difference, wherein after correcting the skew difference, the calculating means calculates an amount of registration difference in a main scanning direction in accordance with results detected by the three or more sensors, wherein the correcting means corrects the registration difference in the main scanning direction in accordance with the calculated amount of registration difference in the main scanning direction.

12. The image forming apparatus as claimed in claim 11, wherein the calculating means calculates by satisfying an equation of:

the amount of registration difference in the main scanning direction $=-\{(C+D)/2\}$, wherein C=a maximum value of the registration difference in the main scanning direction among the results detected by the three or more sensors, wherein B=a minimum value of the registration difference in the main scanning direction among the results detected by the three or more sensors.

* * * * *